US005935449A

United States Patent [19]
Buehler et al.

[11] Patent Number: 5,935,449
[45] Date of Patent: Aug. 10, 1999

[54] AUTOMATED SEPARATOR OF LIGHT FLUIDS BY SPECIFIC GRAVITY

[75] Inventors: Stephen L. Buehler; Anthony Stanaland, both of Montgomery, Ala.

[73] Assignee: Jay R. Smith Manufacturing Co., Montgomery, Ala.

[21] Appl. No.: 08/811,477

[22] Filed: Mar. 4, 1997

[51] Int. Cl.⁶ .................. B01D 17/032; B01D 17/028; B01D 17/12
[52] U.S. Cl. ................. 210/742; 210/86; 210/91; 210/104; 210/149; 210/187; 210/744
[58] Field of Search .................. 210/85, 86, 91, 210/94, 104, 105, 134, 143, 149, 187, 294, 295, 519, 521, 522, 539, 744, 774, 800, 801, 804, 538, 540, 742

[56] References Cited

U.S. PATENT DOCUMENTS

| | | | |
|---|---|---|---|
| 2,284,737 | 6/1942 | Hirschstein | 210/86 |
| 3,253,711 | 5/1966 | Young . | |
| 4,268,396 | 5/1981 | Lowe | 210/742 |
| 4,543,191 | 9/1985 | Stewart et al. . | |
| 4,820,425 | 4/1989 | Telfer . | |
| 4,880,533 | 11/1989 | Hondulas . | |
| 5,178,754 | 1/1993 | Batten et al. | 210/187 |
| 5,400,651 | 3/1995 | Welch . | |
| 5,431,826 | 7/1995 | Becker et al. | 210/104 |
| 5,705,055 | 1/1998 | Holloway et al. | 210/149 |

FOREIGN PATENT DOCUMENTS

| | | | |
|---|---|---|---|
| 3739687 | 6/1989 | Germany | 210/86 |

*Primary Examiner*—Joseph W. Drodge
*Attorney, Agent, or Firm*—William S. Ramsey

[57] ABSTRACT

The automatic grease separator receives wastewater containing grease and other light fluids, separates the water portion from the light fluids portion, and stores the light fluids portion. A computer is used to control the operation of separator functions including automatic transfer of light fluids from the separator to grease containers and automatic shut-down of the separator when its capacity is exceeded. Warning devices which indicate malfunction or the need for maintenance also are controlled by the computer. The grease separator uses grease level sensors based on capacitive level sensing. These sensors are insensitive to coating of the sensors by grease and oil. The grease and other light fluids are maintained in a fluid phase by the thermostatic-controlled addition of hot water. This feature provides an added element of safety by eliminating the need to heat the separator by a resistant heater which introduces the possibility of a grease fire.

6 Claims, 7 Drawing Sheets

AUTOMATED SEPARATOR OF LIGHT FLUIDS BY SPECIFIC GRAVITY

BACKGROUND OF THE INVENTION

1. Field of the Invention

This invention relates to the separation of greases and oils from water using automatic processes and apparatus.

2. Description of Related Art

Grease separators are used to separate and remove for recycling the grease, oil and dirt found in wastewater which has been used in food preparation establishments. The primary source of such wastewater is water used to clean stoves and grills and from dishwashers, with mop water and floor drains a secondary source. The wastewater may contain fats, oils, greases, soap residues, dirt, and floor sweepings. Grease, oil, fats, and other materials found in wastewater which have a density less than that of water will be referred to collectively in this application as "light fluids" or as "grease and oil".

There is a problem with the disposal of such wastewater in sewers because of the tendency of grease to coagulate on the internal walls of pipes and plug the lumen of the pipes, a particular problem at bends and valves. In addition, many jurisdictions charge a fee for the disposal of wastes having a high biological oxygen demand, such as food establishment wastewaters. Finally, the salvage value of grease and oil recovered from wastewaters provides an additional economic incentive for separation and recovery of the grease and oil.

Grease separators generally include a tank in which the wastewater stream is allowed to stand while the grease and oil separate. The grease and oil accumulate at the top of the tank because grease and oil is less dense than is water. Automated separators have provisions for heating the fluids to prevent coagulation of the grease and oil and have means for detecting the grease and oil level to allow for the automatic removal of grease and oil when the separator approaches its capacity. Conventional systems have sensors to detect the level of grease and oil. These sensors are inactivated or severely inhibited in their response when coated with grease and dirt, necessitating frequent cleaning to maintain operation of the separator. In addition, conventional systems use electrical resistance heaters to maintain the grease and oil in liquid form for removal. Such heaters present safety problems and are expensive to operate.

U.S. Pat. No. 2,253,711 discloses a system for separating ballast water and oil in sea-going vessels. A capacitance probe is used to continuously measure the dielectric constant of the fluids in the system in order the detect the presence of a slug of oil.

U.S. Pat. No. 4,543,191 discloses the use of a capacitance cell used to measure the capacitance of an oil stream in the presence of basic sediment and water.

U.S. Pat. No. 4,820,425 discloses a robotic filtration station in which capacitance measurements are taken to determine the conclusion of the filtering process.

U.S. Pat. No. 4,880,533 discloses a grease separator having sensors which operate by determining the heat transfer rate of the medium in which the sensor is immersed. A microprocessor responds to changes in the heat transfer rate by activating a grease skimmer and valves.

U.S. Pat. No. 5,400,651 discloses an apparatus which uses spaced capacitance probes to determine the presence of water in an oil storage tank.

U.S. Pat. No. 5,431,826 discloses an automatic grease separator in which electrodes which measure conductivity of the medium are used to determine the level of grease in the separator and to activate a valve which allows the removal of grease. A electrical resistance heater is used to maintain the grease in the fluid state.

Capacitance probes have the desirable characteristic of insensitivity to coating with the grease, oil and dirt often found in wastewater. Their use in the grease separator of this invention fulfills a long felt need for a reliable grease separator which does not require frequent cleaning. In addition, the current invention avoids the problems of electrical heaters in the separator by using heated make-up water to maintain fluidity of the grease and oil before removal.

SUMMARY OF THE INVENTION

The automatic separator of this disclosure is advantageous in that it uses capacitance sensors which are not sensitive to degradation by coating with grease and oils. It is controlled by a microprocessor which operates the grease draw off when the light fluid or grease and oil level reaches 50% of the capacity as indicated by a first capacitance sensor. The grease and oil is collected in a bucket which is automatically weighed. The microprocessor signals an alarm when the bucket is full.

A thermometer senses the temperature of the separator contents when the separator is at the 50% of light fluids or grease and oil capacity. If the temperature is at 160° F., indicating the light fluids or grease and oil are in the liquid state, the pump is activated. If the temperature is below 160° F., additional hot water is added until that temperature is reached and then the pump is activated.

A second capacitance sensor determines when the light fluids or grease and oil have reached 85% of capacity. At that time, a shut off valve is operated to prevent further inflow of waste water and an alarm is signaled.

The objective of this invention is to provide an automatic separator of light fluids having oil and grease level sensors insensitive to coating with grease and oil.

Another objective of this invention is to provide an automatic separator of light fluids having a solids interceptor which traps solids in the wastewater.

Another objective of this invention is to provide an automatic separator of light fluids in which the separator contents are heated by adding hot water.

Another objective of this invention is to provide an automatic separator of light fluids having automatic controls for all functions.

A final objective of this invention is to provide an automatic separator of light fluids which operates economically and with minimal environmental impact.

DESCRIPTION OF THE PREFERRED EMBODIMENTS

Figure 1:
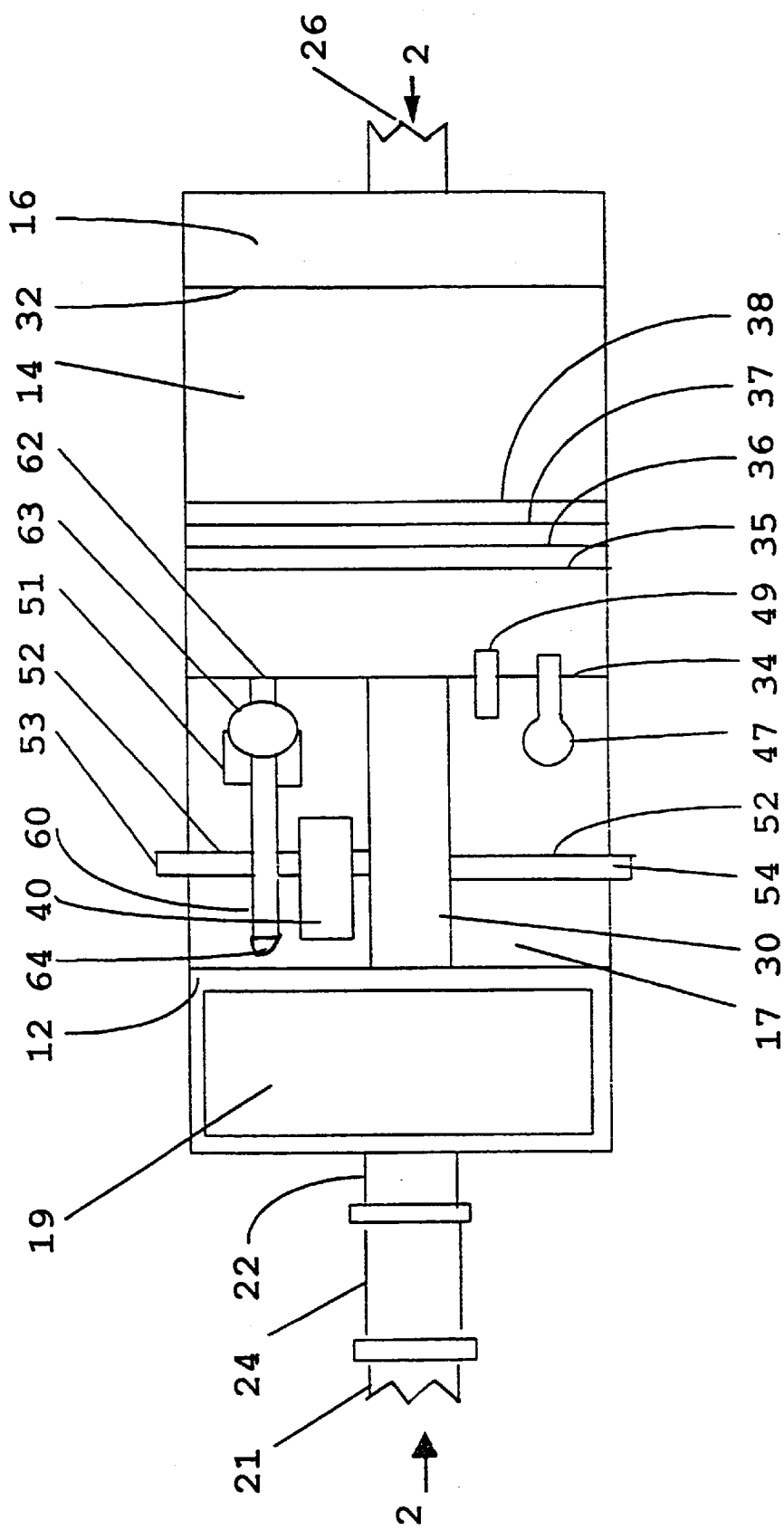
FIG. 1 is a top view of the first embodiment automatic separator with the top covers removed.
Figure 2:
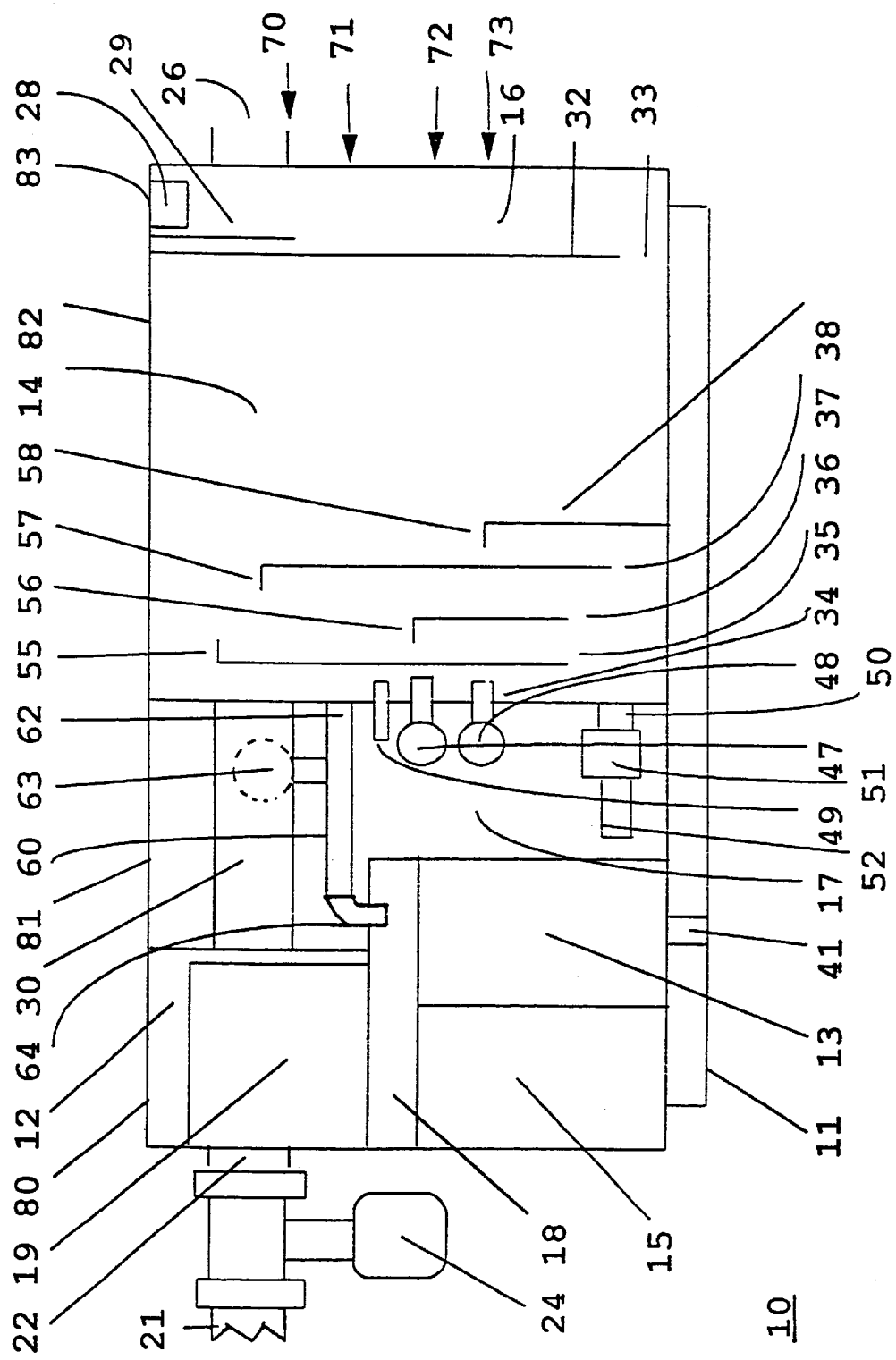
FIG. 2 is a side view of a cross section of the first embodiment automatic separator taken along line 2—2 of FIG. 1.

The first embodiment automatic separator is shown in FIGS. 1 and 2. FIG. 1 is a top view of the first embodiment automatic separator with the top covers removed. FIG. 1 shows the wastewater supply line 21 which brings wastewater to the separator. Inlet valve 24 controls the entry of wastewater into the separator. The inlet valve 24 is connected to the inlet 22 in the side of the separator. Wastewater enters through the inlet 22 and enters the solids interceptor bucket 19 which sets in the solids interceptor 12. The solids interceptor bucket 19 is a bucket made of wire mesh and retains solids while allowing passage of the wastewater from the solids interceptor 12 through the connecting pipe 30 and through the interceptor wall into the grease interceptor 14.

After entering the grease interceptor 14, the wastewater encounters a first baffle 35, a second baffle 36, a third baffle 37 and a fourth baffle 38. The baffles extend from one side to the other of the grease interceptor 14. The baffles serve to reduce the turbulence of the stream of entering wastewater and cause the wastewater to traverse the grease interceptor through flow at the bottom of the interceptor. Separation of the grease and oil from the water takes place within the grease interceptor. The grease and oil or light fluids migrate to the top of the grease interceptor and the water remains at the bottom. A riser baffle 32 extends from side to side of the grease interceptor with the formation of the water chamber 16. The riser baffle 32 does not extend to the bottom of the grease interceptor leaving a passage 33 in FIG. 2 for the passage of water from the grease interceptor 14 to the water chamber 16. The water exits the separator via outlet 26.

The control chamber 17 contains the control unit 40. The interceptor wall 34 separates the grease interceptor 14 and control chamber 17. The grease sensor No. One 47, the grease sensor No. Two 48, the thermometer 49, heat exchanger 50, and grease draw off connection 62 jut through the interceptor wall 34 into the grease interceptor 14. The grease draw off pipe 60 is attached to the grease draw off connection 62 and is used to remove grease from the grease interceptor. A grease valve 63 controls the flow of grease through the grease draw off pipe 60. A grease draw off pipe elbow 64 directs the flow of grease when grease is removed from the grease interceptor 14. Make-up hot water added through the hot water inlet 50 into the grease interceptor 14 is used to heat the contents of the grease interceptor in order to prevent coagulation of the grease and oil which would inhibit removal of grease and oil from the grease interceptor. The flow of hot water through the hot water inlet 50 is controlled by the hot water solenoid valve 51 connected to a hot water supply line 52 with connections to an external source of hot water on the left 53 and right 54 side of the separator. Use of make up hot water rather than an electric heater to heat the separator avoids the possibility of fire attendant upon accidental exposure of grease and oil to a high amperage electric heater.

FIG. 2 is a cross section of the first embodiment separator taken along line 2—2. FIG. 2 shows the solids interceptor cover 80, control chamber cover 81, grease interceptor cover 82, and water chamber cover 83. The water chamber port 28 which may be used to clean the water chamber 16 is shown.

FIG. 2 provides a side view of the wastewater supply line 21, inlet valve 24, and inlet 22. The solids interceptor basket 19 is shown located in the solids interceptor 12. The connecting pipe 30 carries wastewater across the control chamber through the interceptor wall 34 and into the grease interceptor 14. Baffle No. One 35, baffle No. Two 36, baffle No. Three 37 and baffle No. Four 38 are shown. Baffles No. One-Four are L-shaped with a leg, 55, 56, 57, and 58, respectively, at the top of the baffle. These legs facilitate the separation of grease and oil from water in the grease interceptor. Riser baffle 32 is shown along with passage 33 between the bottom of the baffle and the bottom of the grease interceptor. Riser vent 29 is attached to the water chamber cover 83 and allows the escape of air from the water chamber. Outlet 26 allows the outflow of water from the separator. Arrow 70 indicates the static water line. A base 11 supports the separator.

The grease draw off connection 62 is a pipe which extends into the grease interceptor 14. A grease draw off pipe 60 is attached at one end to the grease draw off connection 62. At the other end, a draw off pipe elbow 64 is directed with the opening downward. A grease valve 63 controls the passage of grease through the grease draw off pipe 60. Arrow 71 indicates the grease draw off level.

Grease sensor No. One 47 protrudes through interceptor wall 34 into grease interceptor 14 at the 50% capacity level of arrow 71. The 50% capacity level means the separator contains 50% of its capacity of grease and oil when the grease and oil is at that level. Grease sensor No. Two 48 protrudes through interceptor wall 34 into grease interceptor 14 at the 85% capacity level of arrow 72. The 85% capacity level means the separator contains 85% of its capacity of grease and oil when the grease and oil is at that level. The thermometer 49 is located above grease sensor No. One.

The grease chamber 18 contains grease bucket or drum 13 and reserve grease bucket or drum 15. The presence and weight of the grease bucket is determined by the grease bucket scale 41. Knowledge of the specific gravity of the grease and oil to be collected is used to set the computer to activate an amber light (No. 44, FIG. 5) and audible alarm (No. 46, FIG. 5) when 85% of the capacity of the grease bucket has been attained. The grease bucket 13 and reserve grease bucket 15 each hold up to 25 lbs grease and oil. The grease bucket 13 is removed by the operator when full and replaced by the reserve grease bucket 15 which becomes the grease bucket 13. The operator then removes the collected grease and oil from the grease bucket which is then placed in the separator as the reserve grease bucket.

Figure 3:
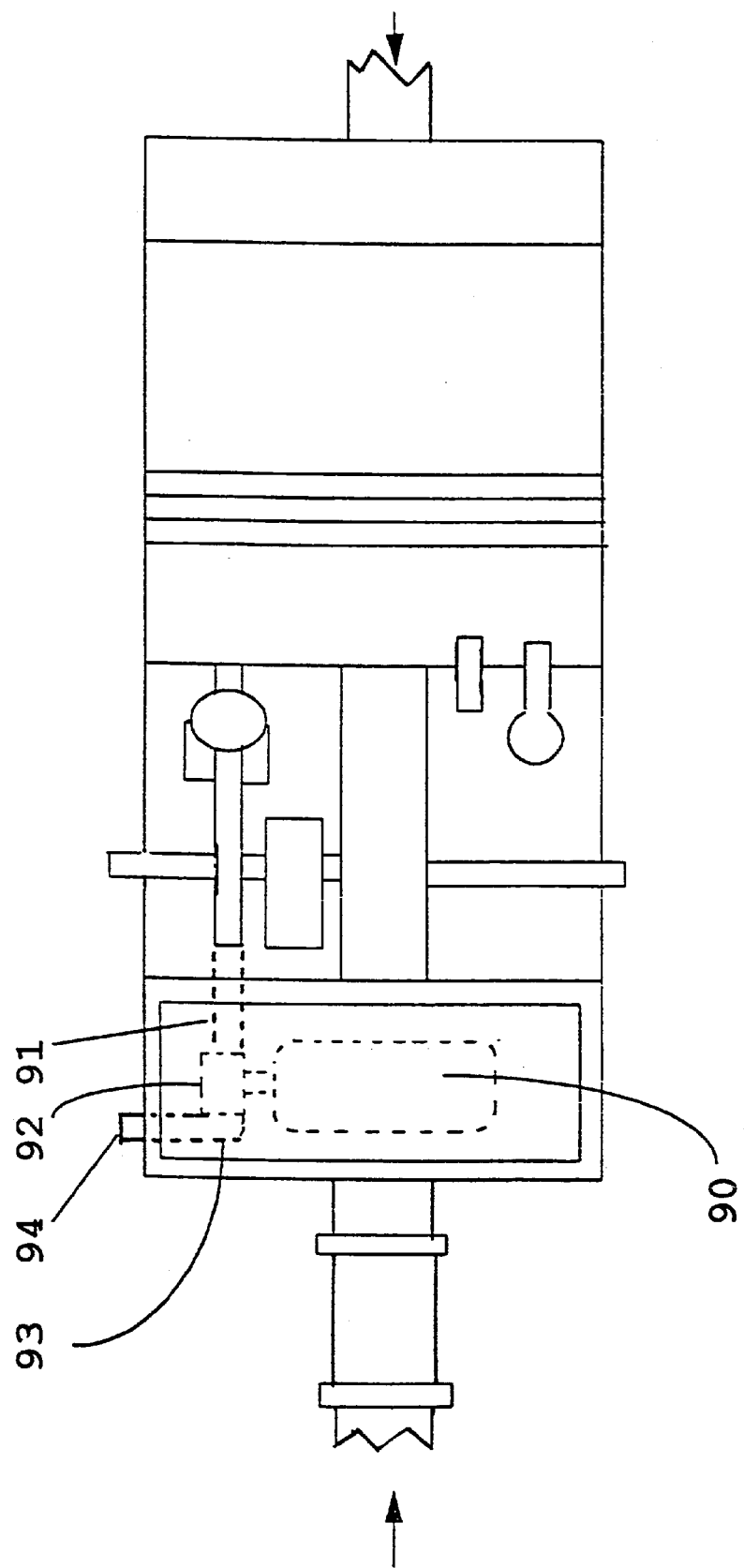
FIG. 3 is a top view of the second embodiment automatic separator with the top covers removed.
Figure 4:
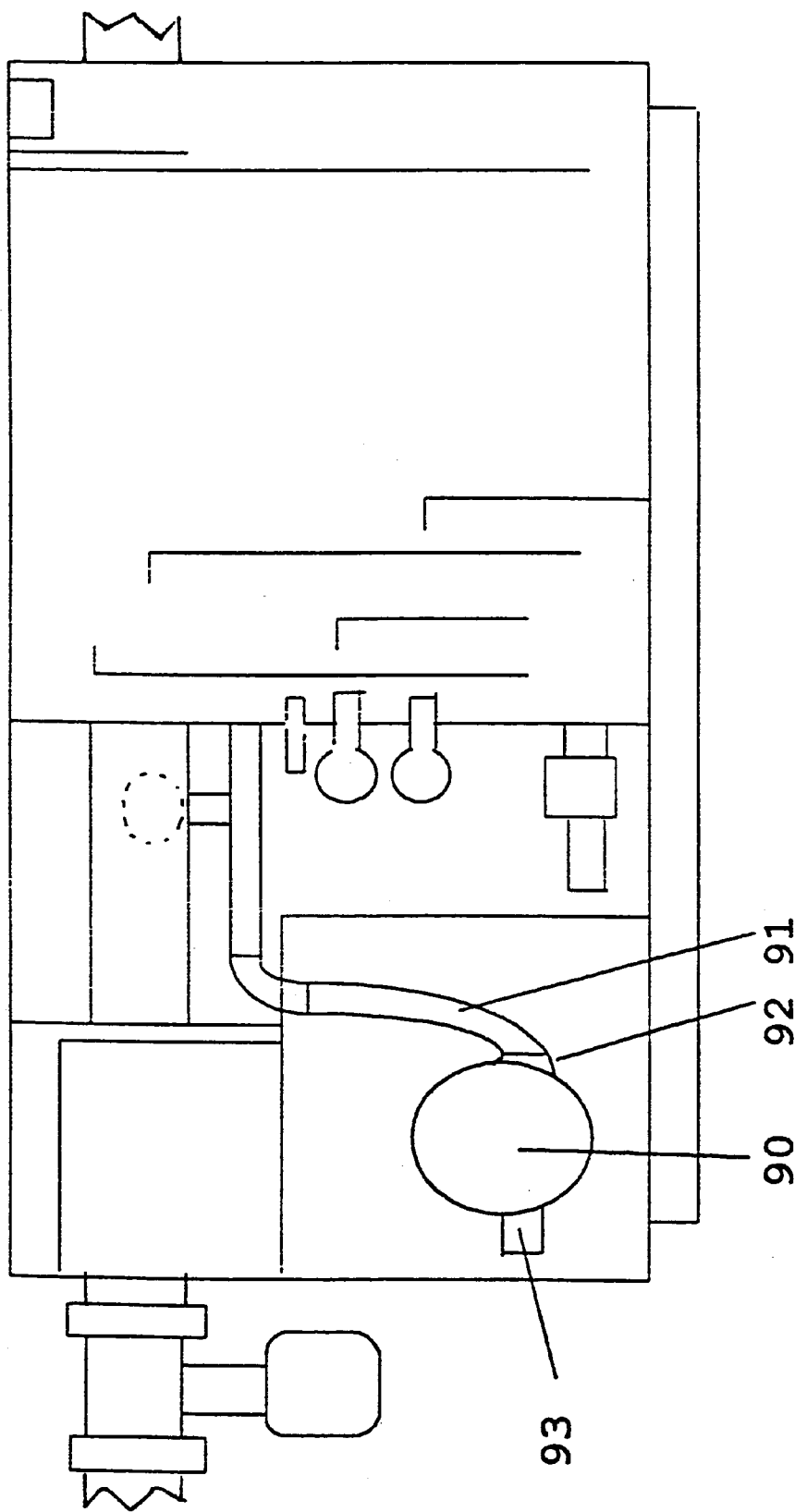
FIG. 4 is a side view of a cross section of the second embodiment automatic separator taken along line 4—4 of FIG. 3.

FIGS. 3 and 4 are views of the second embodiment grease separator. The second embodiment is like the first embodiment except there is no grease bucket or reserve grease bucket in the second embodiment. The grease removed from the grease interceptor is pumped from the separator.

FIG. 3 is a top view of the second embodiment grease separator as in FIG. 1. Dotted lines are used to depict the grease line 91, a pipe which attaches to the draw off pipe elbow 64. The grease line 91 conveys grease to the grease pump 92 and then the grease outlet line 93 carries the grease to the grease outlet port 94 on the outside of the separator. The grease pump 92 is powered by the grease motor 90.

FIG. 4 is a side view of the second embodiment grease separator as in FIG. 4. Visible are the draw off pipe elbow 64, grease line 91, grease pump 92, grease motor 90, and grease outlet line 93.

Figure 5:
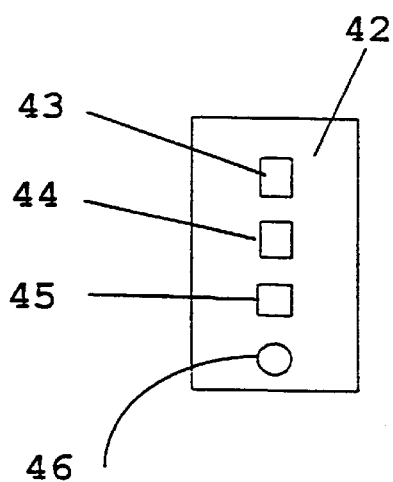
FIG. 5 is a plan view of the control panel.

FIG. 5 shows the control panel 42 which is located on the top of the computer (40 in FIG. 1). Located on the control plate 42 is a green push button 43, a amber push button 44, a red push button 45, and an alarm silencer 46. The push buttons are internally illuminated.

The grease sensors are sense the capacitance of the material in which they are immersed and can detect the presence of grease and oils even when covered by heavy grease build-up. A preferred capacitive level sensor is the Probesie CMP, SIE Part No. SKI-HT 125-FS-J-M18-P-S-KL 07061, manufactured by SIE SENSORS, Inc. of Toledo, Ohio.

A preferred thermostat is the White-Rodgers 3F01-111 fixed setting snap disc fan control, which closes at 110° F. and opens at 90° F. A second preferred thermostat is the White-Rodgers 3F05-1 adjustable setting snap disc fan control which is adjustable with a range of 90° F. to 130° F. with a differential of 20° F. Both thermostats may be obtained from White-Rodgers Division of Emerson Electric Co., St. Louis, Mo.

A preferred hot water solenoid valve is a DEMA solenoid valve Model No. 442P or 443P having a maximum pressure differential of 125 psi and pressure range of 3–150 psi and may be obtained from McMaster-Carr Supply Co., of Elmhurst Ill.

The computer or programmable logic controller (PLC) (40 in FIG. 1) is preferably a GE Fanuc Automation Series 90™ Micro Programmable Logic Controller computer which may be obtained from Fanuc Robotics Corp. of Auburn Hills, Mich.

The preferred material of construction of the grease separator is stainless steel. Pipes, fittings, etc. are constructed of suitable durable materials, such as stainless steel, brass, or copper.

The operation of the grease separator may be summarized as follows: Wastewater containing grease and oil (also called light fluids) flows into the solids interceptor and thence into the grease interceptor. The grease and oil or light fluids separate at the top of the grease interceptor and the water collects at the bottom. When the grease and oil level reaches the 50% capacity level, and the temperature of the grease and oil is 120° F. or greater, the grease valve opens and the grease and oil flows into the buckets, or is withdrawn by the grease pump. If the temperature is below 120° F., make-up hot water at about 160° F. is added to bring the temperature to 120° F.

If the grease and oil should reach the 85% capacity level, the shut-off valve is activated, which prevents flow of wastewater into the separator, and an alarm is signaled which indicates clean out is required. An alarm also indicates the need to replace the grease bucket with a reserve grease bucket.

Figure 6:
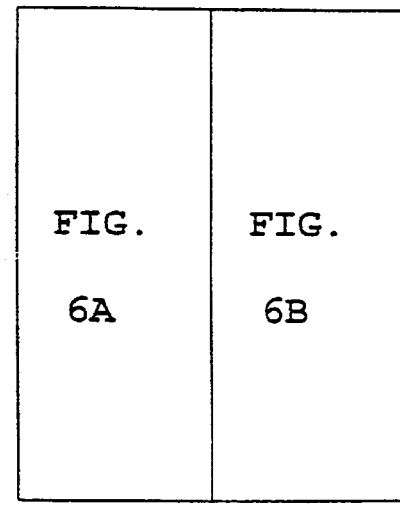
FIG. 6, together with FIG. 6A and FIG. 6B, is a flow chart of the operations of the first embodiment automatic separator.
Figure 6A:
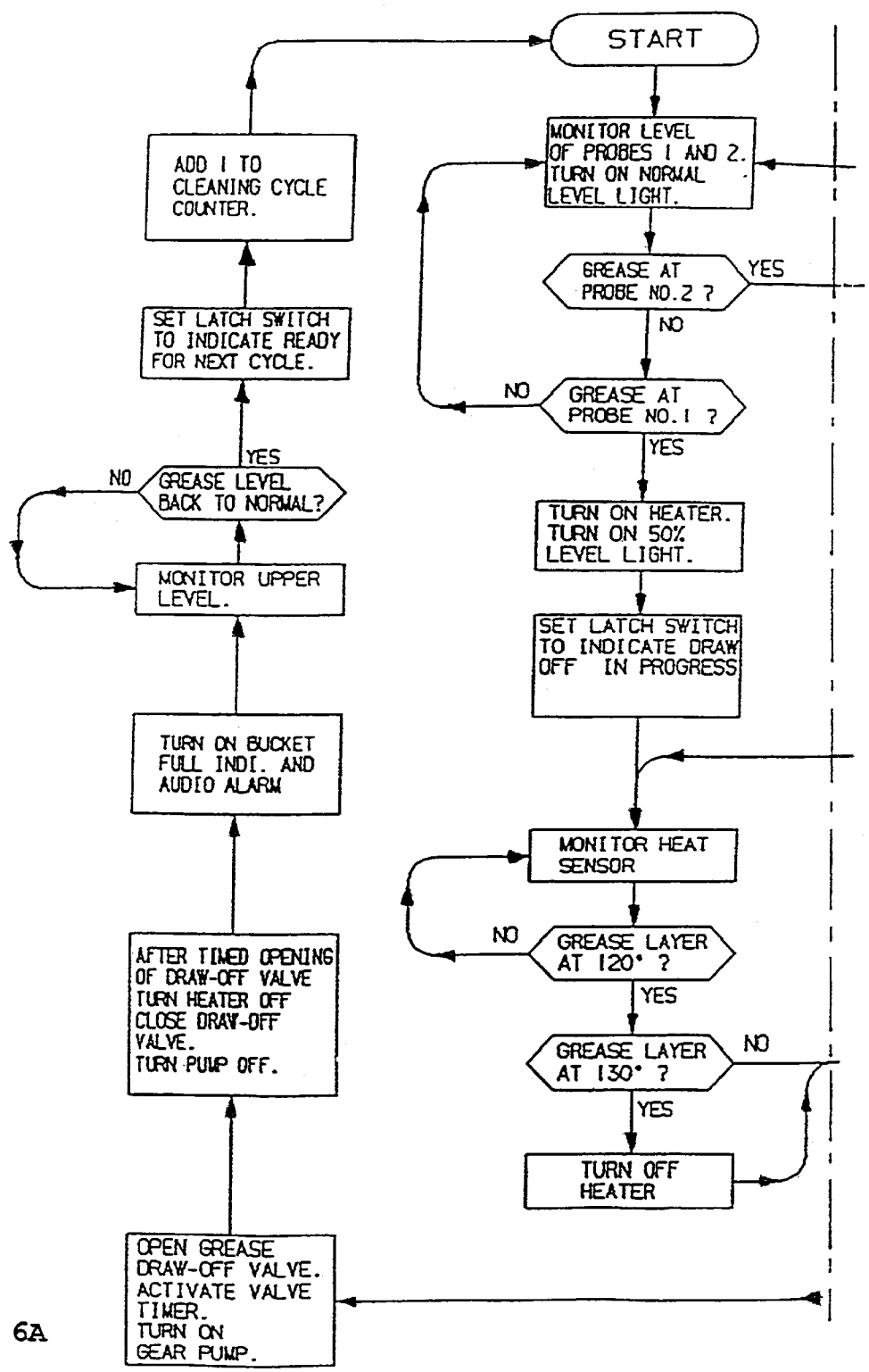
Figure 6B:
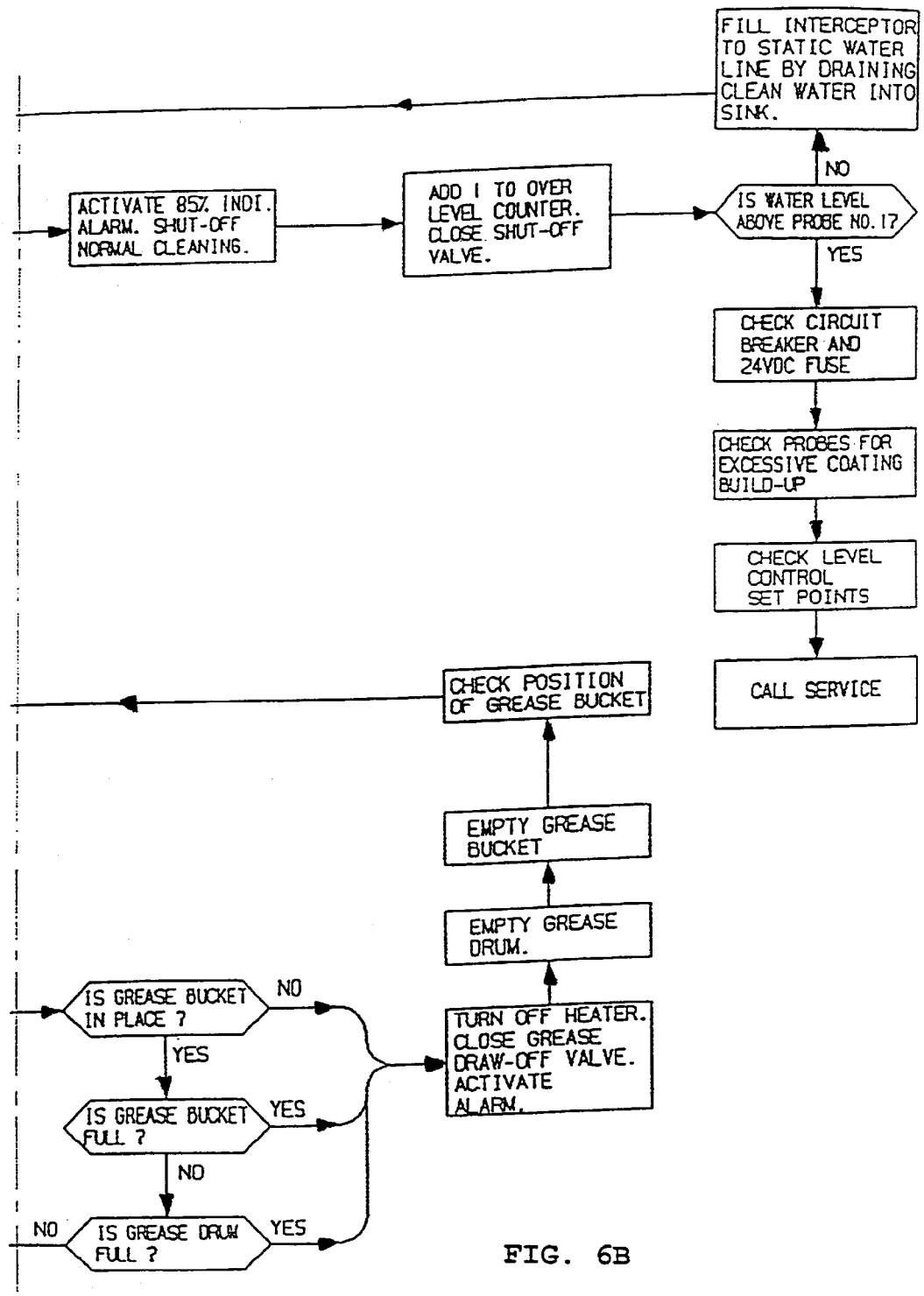

FIG. 6 consisting of FIG. 6A and FIG. 6B is a flow chart of the operation which is described as follows:

The programmable logic controller (PLC) or computer is the heart of the separator operation. The level probes are the key to the PLC's correct operation. If the probes give an incorrect "ON" signal to the PLC, the unit will cease to work properly. The capacitive probes used are designed to operate correctly even with a thick coating of fluid or other material on the probe itself.

The separator is filled with water to the static water line and power is then turned on. The PLC's central processing unit will run diagnostics on itself. The probes are now indicating to the PLC that no light fluid is at the probe No. 1 level, which is located at 50% of the separator's capacity. The unit is now ready for operation.

As wastewater enters the separator solid particles are retained by the solids interceptor and the solids-free wastewater enters the grease interceptor. The light fluid separates from the water portion of the wastewater due to gravity and the light fluid collects on top of the water and will push the water down and into the riser chamber.

When enough light fluid collects that probe No. 1 is immersed in light fluid that probe will send an 'ON' signal to the PLC. The PLC will then delay this signal for an adjustable amount of time to avoid a premature signal stemming from momentary fluctuations in the light fluid level.

After this delay the PLC then turns on the green lamp in the 50% level push button and if needed opens the hot water supply valve. This step is indicated in FIG. 6A as "Turn On Heater." About 5–6 gallons of hot water at 160° F. is added to the separator. The light fluid or grease and oil layer is now being heated. The green push button is used to manually open the draw-off valve to allow cleaning.

Once the fluid layer reaches 120° F., the thermostat sends an "ON" signal to the PLC. The PLC is programmed to delay the signal allowing the hot water valve to remain open to completely melt the fluid in the draw-off valve, piping and the separator. The thermostat is a snap-disc type with a fixed setting. The programmable delay allows adjustment of the thermostat to a higher temperature and the use of a low cost thermostat. When the thermostat indicates the fluid layer has reached 130° F. the hot water valve is closed. This is indicated in FIG. 6A as "Turn Off Heater."

After an adjustable length of time the PLC will open the fluid draw-off valve allowing the fluid to flow from the separator to the fluid collection bucket. A timer will close the valve after the bucket is approx. half full. The draw-off valve is then closed and a delay timer is activated allowing the draw-off piping to completely empty. The yellow lamp along with the audio alarm are actuated after the delay to indicate to the operator that the bucket needs to be emptied. Pressing the yellow push button on the control panel will silence the audio alarm. If, after 15 min., the bucket is not removed, the alarm will sound again. The PLC will continue this until the bucket is removed and emptied. After the "bucket full" alarm is silenced, the bucket is then removed and emptied. At this time the "bucket out of position" alarm is not sounded.

The bucket is now full and ready to be emptied. The draw-off valve is closed. The hot water valve is closed. This is indicated in FIG. 6B as "Turn Off Heater." The alarm is activated. The operator empties and replaces the bucket. The bucket position switch indicates to the PLC that the bucket is in place in the separator. Fluid is still covering the 50% level probe. The PLC now waits for the water level to rise. Wastewater entering into the separator causes the remaining fluid layer to rise to fill the void left by the fluid which was drained. The rising water level covers probe No. 1 with water. The PLC adds 1 to the cycle counter, resets itself and is ready for the next cycle.

If, for any reason, the normal cycle is interrupted and fluid is not removed from the separator, probe No. 2 is placed at the 85% capacity of fluid level to detect this over load. The PLC will receive the "ON" signal from the 85% level probe, stop the cleaning cycle, close the draw-off valve, close the inlet shut-off valve and close the hot water valve. The red lamp on the control panel is turned on and the audio alarm is sounded. Pressing the red push button will silence the alarm. The PLC will now wait for the water level to be returned to normal. At this time the separator should be manually cleaned and clean water drained into the unit until probes No. 1 and No. 2 are covered with water.

If both probes are operational and the PLC is operational, this should return the unit to normal operation. All lamps on the control panel will be off and the shut-off valve will automatically open, allowing the normal operation of the separator.

If the PLC has malfunctioned, turning the power to the unit off and then back on could correct the problem. If not, a personal computer can be connected to the PLC to view the fault tables in the PLC. These tables will indicate failures in the PLC such as CPU hardware failure, CPU software failure, low battery signal or no user program present.

The PLC will generate an error message in the form of an LED blink code.

It will be apparent to those skilled in the art that the examples and embodiments described herein are by way of illustration and not of limitation, and that other examples may be used without departing from the spirit and scope of the present invention, as set forth in the appended claims.

We claim:

1. An automatic separator for separating wastewater into light fluids and water comprising:

a solids interceptor for removing solids from the wastewater which comprises mixtures of light fluids and water, an inlet opening connected to said solids interceptor for introducing mixtures of the light fluids and water into said automatic separator, a grease interceptor having an interceptor chamber where said light fluids are allowed to separate from said water, said grease interceptor connected to said solids interceptor by a connecting pipe, L-shaped baffles in said grease interceptor near said connecting pipe for deflecting the mixture of light fluids and water toward the bottom of said grease interceptor, a riser baffle at one end of said grease interceptor forming a water chamber, said riser baffle mounted for leaving an opening between the bottom of the riser baffle and the bottom of the grease interceptor for the passage of water into said water chamber, an outlet connected to said water chamber, said inlet, connecting pipe, and outlet being at the same level, a first capacitance sensor for detecting when the level of light fluids in said grease interceptor chamber reaches a first preset value, a grease draw off connection for removing light fluids from said interceptor chamber, a grease bucket for receiving grease, weighing means for determining that said grease bucket is in place and for determining the weight of the contents of said bucket, control means for controlling said grease valve so the grease valve is open when the level of light fluids reaches a first preset value, a second capacitance sensor for detecting when the level of light fluids in said interceptor chamber reaches a second preset value, a shut-off valve on said inlet, computer control means for closing said shut-off valve when the level of light fluids in said interceptor chamber reaches a second preset value, a hot water supply line for providing said interceptor chamber with a flow of hot water, a hot water supply valve for controlling the flow of hot water through said supply valve into said interceptor chamber, a thermostat for determining the temperature of said contents of said interceptor chamber, and computer control means for controlling the hot water supply valve in response to the temperature of said contents of said interceptor chamber, audible and visual alarms which indicate the status of said separator, and computer control means which control said audible and visual alarms.

2. An automatic separator for separating wastewater into light fluids and water comprising:

a solids interceptor for removing solids from the wastewater which comprises mixtures of light fluids and water, an inlet opening connected to said solids interceptor for introducing mixtures of the light fluids and water into said automatic separator, a grease interceptor having an interceptor chamber where said light fluids are allowed to separate from said water, said grease interceptor connected to said solids interceptor by a connecting pipe, baffles in said grease interceptor near said connecting pipe for deflecting the mixture of light fluids and water toward the bottom of said grease interceptor, a riser baffle at one end of said grease interceptor forming a water chamber, said riser baffle mounted for leaving an opening between the bottom of the riser baffle and the bottom of the grease interceptor for the passage of water into said water chamber, an outlet connected to said water chamber, said inlet, connecting pipe, and outlet being at the same level, a capacitance sensor for detecting when the level of light fluids in said interceptor chamber reaches a first preset value, a grease draw off connection for removing light fluids from said grease interceptor, an automatic grease valve for allowing light fluids to flow from said interceptor chamber, control means for opening said grease valve when the level of light fluids in said interceptor chamber reaches a first preset value, a grease bucket which receives light fluids from said grease interceptor, and weighing means for determining that said grease bucket is in place and for determining the weight of said bucket.

3. An automatic separator for separating wastewater into light fluids and water comprising:

a solids interceptor for removing solids from the wastewater which comprises mixtures of light fluids and water, an inlet opening connected to said solids interceptor for introducing mixtures of the light fluids and water into said automatic separator, a grease interceptor having an interceptor chamber where said light fluids are allowed to separate from said water, said grease interceptor connected to said solids interceptor by a connecting pipe, baffles in said grease interceptor near said connecting pipe for deflecting the mixture of light fluids and water toward the bottom of said grease interceptor, a riser baffle at one end of said grease interceptor forming a water chamber, said riser baffle mounted for leaving an opening between the bottom of the riser baffle and the bottom of the grease interceptor for the passage of water into said water chamber, an outlet connected to said water chamber, said inlet, connecting pipe, and outlet being at the same level, a capacitance sensor for detecting when the level of light fluids in said interceptor chamber reaches a first preset value, a grease draw off connection for removing light fluids from said grease interceptor, an automatic grease valve for allowing light fluids to flow from said interceptor chamber, control means for opening said grease valve when the level of light fluids in said interceptor chamber reaches a first preset value, a grease bucket which receives light fluids from said grease interceptor, weighing means for determining that said grease bucket is in place and for determining the weight of said bucket, a hot water inlet for providing said interceptor chamber with hot water, a hot water supply valve for controlling the flow of hot water through said hot water inlet into said interceptor chamber, a thermostat for determining the temperature in said interceptor chamber, and control means for controlling the hot water supply valve in response to the temperature of said contents of said interceptor chamber.

4. An automatic separator for separating wastewater into light fluids and water comprising:

a solids interceptor for removing solids from the wastewater which comprises mixtures of light fluids and water, an inlet opening connected to said solids interceptor for introducing mixtures of the light fluids and water into said automatic separator, a grease interceptor having an interceptor chamber where said light fluids are allowed to separate from said water, said grease interceptor connected to said solids interceptor by a connecting pipe, L-shaped baffles in said grease interceptor near said connecting pipe for deflecting the mixture of light fluids and water toward the bottom of said grease interceptor, a riser baffle at one end of said grease interceptor forming a water chamber, said riser baffle mounted for leaving an opening between the bottom of the riser baffle and the bottom of the grease interceptor for the passage of water into said water chamber, an outlet connected to said water chamber, said inlet, connecting pipe, and outlet being at the same level, a capacitance sensor for detecting when the level of light fluids in said interceptor chamber reaches a first preset value, a grease draw off connection for removing light fluids from said grease interceptor, an automatic grease valve for allowing light fluids to flow from said interceptor chamber, and control means for opening said grease valve when the level of light fluids in said interceptor chamber reaches a first preset value, a grease bucket which receives light fluids from said grease interceptor, and weighing means for determining that said grease bucket is in place and for determining the weight of said bucket.

5. The process of separating wastewater comprising mixtures of light fluids and water into light fluids and water using an automatic separator having a grease interceptor with a wall upon which first and second capacitance sensors are mounted, the first capacitance sensor mounted on the grease interceptor wall above the second capacitance sensor, a shut-off valve which prevents entry of wastewater into the grease interceptor when closed, a thermostat for sensing the temperature in the grease interceptor, a supply of hot water to the grease interceptor, a hot water valve which controls the flow of hot water into the grease interceptor, a pump which pumps light fluids from the grease interceptor into a grease bucket, an automatic grease valve which when open allows removal of light fluids from the grease interceptor, comprising the steps:

a. sensing the temperature of wastewater in the grease interceptor in the automatic separator with the thermostat, b. opening the hot water valve and allowing the flow of hot water into the grease interceptor when the temperature of the wastewater is below a preset value, c. closing the hot water valve when the temperature of the wastewater is above a preset value, d. sensing the level of light fluids in the grease interceptor using a first capacitance sensor located on the grease interceptor wall, e. opening the automatic grease valve when the first capacitance sensor is immersed in light fluids, f. pumping light fluids from the grease interceptor into a grease bucket, g. closing the automatic grease valve after a pre-set interval, h. sensing the weight of the grease bucket to determine when it is filled and replacing the filled grease bucket with an empty bucket, i. sensing the level of light fluids at the second capacitance sensor located on the grease interceptor wall below the first capacitance sensor, and j. closing the shut-off valve thereby preventing entry of wastewater into the grease interceptor when the second capacitance sensor is immersed in light fluids.

6. The process of separating wastewater comprising mixtures of light fluids and water into light fluids and water using an automatic separator having a grease interceptor with a wall upon which first and second capacitance sensors are mounted, the first capacitance sensor mounted on the grease interceptor wall above the second capacitance sensor, a shut-off valve which prevents entry of wastewater into the grease interceptor when closed, a thermostat for sensing the temperature in the grease interceptor, a supply of hot water to the grease interceptor, a hot water valve which controls the flow of hot water into the grease interceptor, a pump which pumps light fluids from the grease interceptor into a grease bucket, an automatic grease valve which when open allows removal of light fluids from the grease interceptor comprising the steps:

a. sensing the level of light fluids in said grease interceptor using a first capacitance sensor located on the grease interceptor wall, b. opening the automatic grease valve when the first capacitance sensor is immersed in light fluids, c. pumping the light fluids from the grease interceptor into a grease bucket using the pump, d. closing the automatic grease valve after a pre-set interval, e. sensing the weight of the grease bucket to determine when it is filled, f. replacing the filled grease bucket with an empty bucket, g. sensing the level of light fluids at the second capacitance sensor located on the grease interceptor wall below the first capacitance sensor, and h. closing a shut-off valve thereby preventing flow of wastewater into the grease interceptor when the second capacitance sensor is immersed in light fluids.

\* \* \* \* \*